United States Patent [19]

Davis, Sr.

[11] Patent Number: 4,653,411
[45] Date of Patent: Mar. 31, 1987

[54] TWO ROW CANE PLANTER

[76] Inventor: Darryl B. Davis, Sr., 624 W. St. Peter St., New Iberia, La. 70560

[21] Appl. No.: 710,364

[22] Filed: Mar. 11, 1985

[51] Int. Cl.$^4$ ............................................. A01C 11/00
[52] U.S. Cl. ........................................ 111/3; 239/676
[58] Field of Search ............................. 111/2, 3, 11, 1; 239/672, 676, 679; 83/430, 508, 431, 928; 56/13.9; 221/225; 414/523

[56] References Cited

U.S. PATENT DOCUMENTS

| | | | |
|---|---|---|---|
| 842,172 | 1/1907 | Camp | 239/676 |
| 1,261,368 | 4/1918 | De Fries Dion | 83/430 |
| 1,618,958 | 2/1927 | Kassebeer | 111/3 |
| 3,279,400 | 10/1966 | Gonzalez | 111/3 |
| 3,612,410 | 10/1971 | Steinke | 239/676 X |
| 3,623,298 | 11/1971 | Hitzhusen | 56/13.9 X |
| 3,907,211 | 9/1975 | O'Reilly | 239/676 |
| 3,921,547 | 11/1975 | Etwell | 111/3 X |
| 3,963,138 | 6/1976 | Fowler | 111/2 X |
| 4,067,501 | 1/1978 | Tate | 239/672 |
| 4,072,272 | 2/1978 | Harder | 239/676 |
| 4,106,669 | 8/1978 | Longman | 111/2 X |
| 4,266,490 | 5/1981 | Haines et al. | 111/3 |
| 4,473,184 | 9/1984 | Martin | 239/676 X |
| 4,487,005 | 12/1984 | Claas et al. | 56/14.5 |
| 4,541,570 | 9/1985 | Rieke et al. | 239/676 |

Primary Examiner—Robert A. Hafer
Assistant Examiner—Danton DeMille
Attorney, Agent, or Firm—Robert C. Tucker; William David Kiesel

[57] ABSTRACT

A two row cane planter is provided, comprising a cart having a floor and two side walls; a mechanism attached to the cart, for feeding stalks of cane to the rear of the cart; a drum, rotatably mounted on the rear of the cart and having multiple teeth arranged in a left spiraling row and a right spiraling row, with each row spiraling outward from the center of the drum such that, as the drum rotates, each successive tooth in each row passes the cart floor at a point to the outside of the next preceeding tooth; and a row divider, mounted at the rear of the cart, for receiving stalks of cane from the drum and dividing the stalks into two rows for planting.

14 Claims, 4 Drawing Figures

TWO ROW CANE PLANTER

BACKGROUND OF THE INVENTION

1. Field of Invention

This invention relates to devices which distribute stalks of vegetation for planting and, more particularly, to devices which distribute stalks of sugar cane.

2. Prior Art

There are several types of devices now commercially in use for planting sugar cane. Cane is planted by distributing freshly cut stalks of cane in trenches and then covering the trenches with soil. The process involves cutting the stalks of cane, loading them in carts, transporting them to the field for planting, distributing them evenly in trenches, and covering the trenches. Each step involves the use of heavy equipment and manpower. Any savings in time or equipment result in great economy to the farmer.

Devices currently in use feed stalks of cane from a cart into a single row for planting. In one type of planter, cane is fed into the trench by an arm having a moving chain with teeth which grasp the stalks and feed them to the rear of the cart and into a single trench. An operator is required to move the arm back and forth through the cart in order to evenly feed cane into the trench. Great operator skill is necessary to operate this device. It is accordingly very difficult to evenly feed the proper amount of stalks into the trench. Also, clogging frequently occurs when stalks become entangled in the device.

Another type of cane planter employs a moving wall which pushes the stalks from the front of the cart toward the rear. A rotating drum at the rear of the cart feeds the cane either directly into a single trench or to workers walking behind the cart who in turn lay the cane in the trench. Problems similar to those stated above occur with these devices, also.

No device is currently available which will evenly distribute cane stalks simultaneously to two rows.

SUMMARY OF THE INVENTION

Considering the above, it is an object of this invention to provide a cane planter which will distribute stalks of cane evenly to two rows simultaneously.

It is another object of this invention to provide such a device which will continuously feed stalks of cane without clogging.

Still other objects and advantages of this invention will become apparent from the ensuing descriptions of the invention.

Accordingly, a two row cane planter is provided comprising a cart having a floor and two side walls; a feed means, attached to the cart, for feeding stalks of cane to the rear of the cart; a drum, rotatably mounted on the rear of the cart and having multiple teeth arranged in a left spiraling row and a right spiraling row, with each row spiraling outward from the center of the drum such that, as the drum rotates, each successive tooth in each row passes the cart floor at a point to the outside of the next preceding tooth; and a row divider, mounted at the rear of the cart, for receiving stalks of cane from the drum and dividing the stalks into two rows for planting.

DESCRIPTION OF PREFERRED EMBODIMENTS OF THE INVENTION

Figure 2:
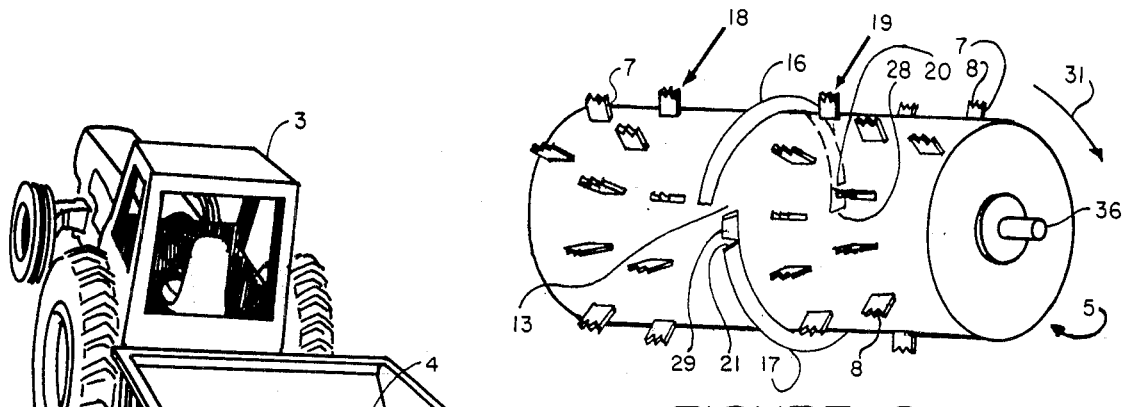
FIG. 2 is a side view of a preferred embodiment of this invention.
Figure 1:
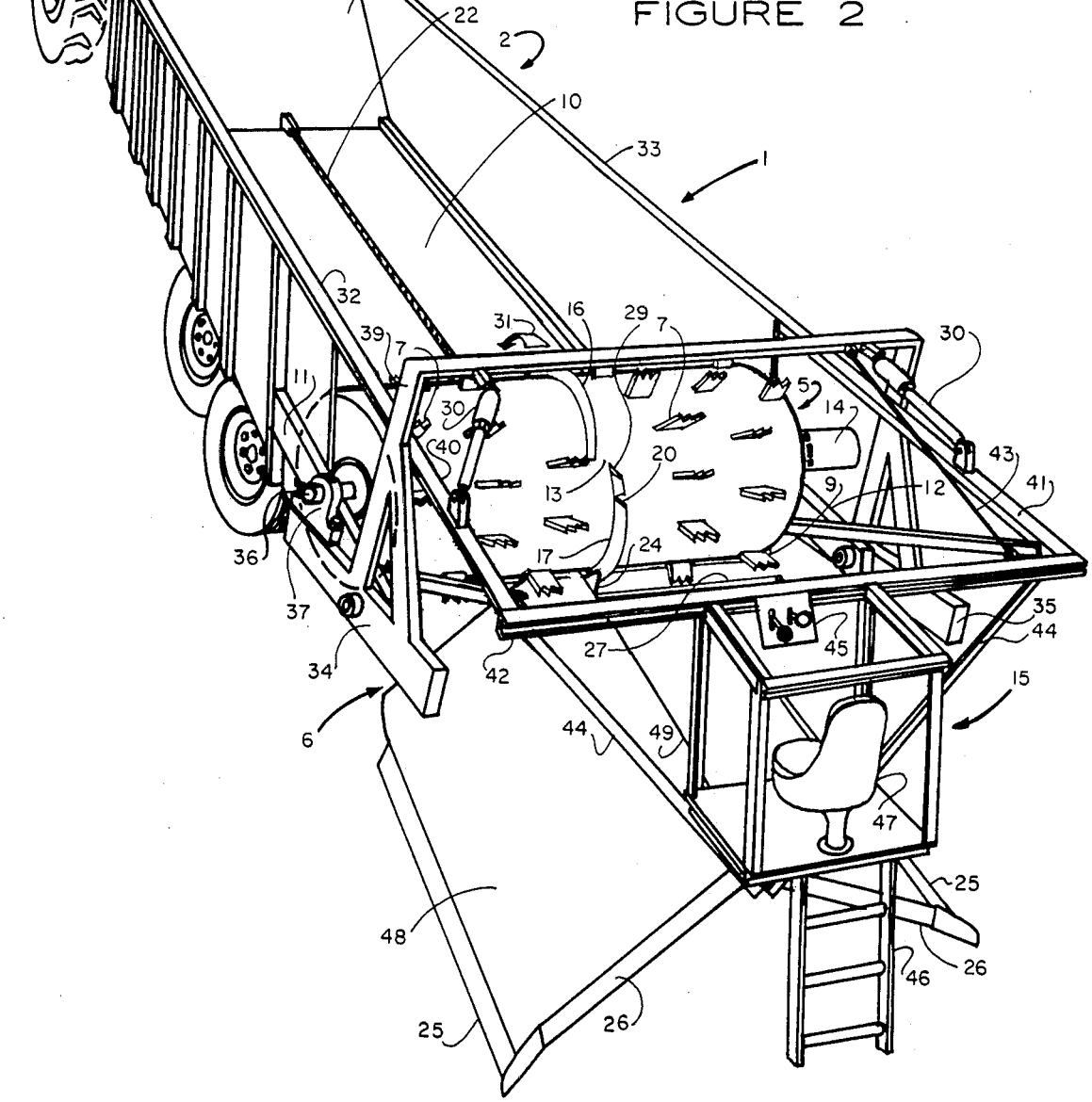
FIG. 1 is a three dimensional view of a preferred embodiment of this invention.

As shown in FIG. 1, the cane planter 1 generally comprises a cart 2, feed means 4, drum 5 and divider means 6. The cart is usually pulled by a tractor 3. Feed means 4, for feeding cane stalks for planting, is usually a wedge-shaped movable wall which is drawn at an adjustable rate toward the rear of the cart 2, pushing the stalks to rotating drum 5 which feeds them onto divider means 6, which feeds the stalks onto the ground. It should be understood that the word "rear" is not meant to restrict the direction in which the cart 2 may be pulled. "Rear" simply designates one end of cart 2. Accordingly, the tractor 3 may be attached to row divider 6 or other suitable structure on that end of the cart 2 and pull the cart 2 from its "rear" end. Stalks are loaded into the cart generally parallel to movable wall 4 such that they are inclined away from drum 5. The movable wall 4 is usually drawn rearward by a cable 22 driven by winch 23 and passing over pulley 50. The drum 5 is usually driven by a motor 14, preferably a hydraulic motor. The rates of movement of wall 4 and rotation of drum 5 are controlled by an operator on control platform 15. For purposes of this application and unless stated otherwise, rotation of drum 5 shall be in the direction indicated by arrows 31 so as to feed stalks from cart 2 onto divider means 6.

Drum 5 is provided with protruding teeth 7 which grasp the stalks and feed them onto divider means 6. Teeth 7 may be provided with notches 8 which will aid in grasping the stalks. The drum 5 is positioned such that the rotating teeth 7 will just clear the cart floor 10 at the rear of cart 2. The drum 5 is rotatably mounted at the rear of cart 2 such that teeth 7 just clear the rear edge 9 of cart floor 10. The drum 5 may be supported such that the drum 5 will move away from the cart floor, preventing large objects such as entangled clumps of cane from jamming between drum 5 and cart floor 10.

Structural support for drum 5, divider means 6 and control platform 15 is as shown in the Figures. Stationary arms 11, 12 are fixedly attached to cart side walls 32, 33 respectively. Rocker arms 34, 35 are pivotally attached to stationary arms 11, 12. Drum shaft 36 is rotatably attached to rocker arms 34, 35 at bearings 37, 38. Rocker bar 39 rises above and spans between rocker arms 34, 35. Frame members 40, 41 extend rearward from cart side walls 32, 33. Cross bar 42 spans between frame members 40, 41. Shock absorbers 30 are connected between rocker bar 39 and frame members 40, 41. The position of drum 5 over cart floor 10 is fixed by a restriction means 43, such as a cable or chain. Diagonal bracing 44 provides additional support for row divider 6 and platform 15.

Figure 3:
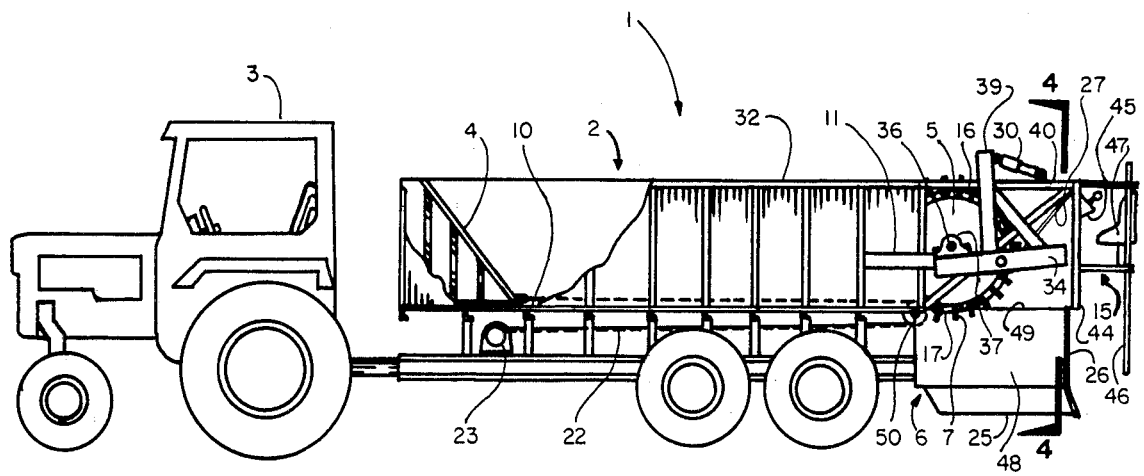
FIG. 3 is a rear view of a preferred embodiment of this invention taken along line 3—3 of FIG. 2.
Figure 4:
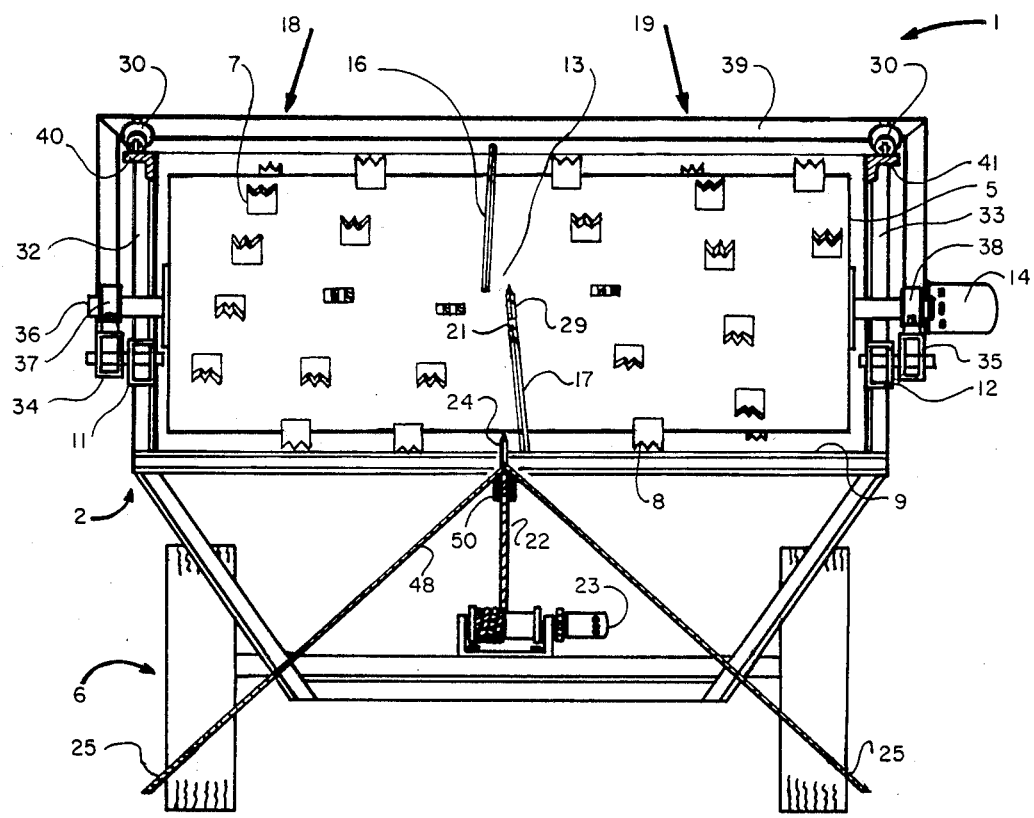
FIG. 4 is a three-dimensional view of a preferred embodiment of the drum of this invention.

Applicant has discovered that cane stalks in cart 2 may be evenly divided by a unique arrangement of teeth 7. As shown in FIGS. 3 and 4, teeth 7 are arranged in a left spiraling row 18 and a right spiraling row 19, spiraling outward from the center 13 of drum 5. This configuration is such that, as the drum 5 rotates, each tooth 7 which passes the rear edge 9 of cart floor 10 is further from the center 13 of drum 5 than the next preceding tooth 7. This arrangement establishes a flow of stalks away from the center of cart 2 toward either side. This flow is necessary both for even distribution of stalks and to prevent clogging at the center of cart 2.

In order to aid in the division of stalks a left guide vane 16 and a right guide vane 17 are provided. The guide vanes 16, 17 are attached near the center 13 of drum 5 and spiral outward from the center 13 in the same direction as teeth 7. Preferably, vanes 16, 17 extend approximately the same radial distance away from drum 5 as teeth 7 so as to just clear the rear edge 9 of cart floor 10. Thus, as drum 5 rotates, left and right guide vanes 16, 17 separate the stalks and guide them to left and right spiraling rows of teeth 18, 19, respectively. It is preferred that each guide vane 16, 17 spiral outward to a point near the first tooth 7 on the applicable row 18, 19. It is also preferred that the leading edge 20 of left guide vane 16 be attached on the opposite side of drum 5 from the leading edge 21 of right guide vane 17.

The row divider 6 is mounted on the rear of cart 2 such that, as stalks are fed by the drum 4, they simultaneously fall into two rows for planting. Divider 6 comprises an inverted V-shaped divider platform 48 having apex edge 49. Divider platform 48 is connected to cart 2 near rear edge 9 such that apex edge 49 is positioned just below the center 13 of drum 5. Adjustable wings 25 may be added to the divider 6 to adjust the device for varying distances between rows. Rear walls 26 may be added to divider 6 in order to prevent stalks from exiting through the rear of divider 6. Trash guard 27 prevents unwanted buildup of shucks and other trash on the center of divider 6, causing them to fall into the rows with the stalks.

A preferred embodiment of the cane planter 1 comprises a stationary blade 24 which is centrally attached to either the cart 2 or the divider 6 near the rear edge 9 of cart floor 10. Drum 4 is provided with at least one rotating blade 28 fixed near the center 13 of drum 5 such that the rotating blade 28 will pass just adjacent to the stationary blade 24, cutting any stalks or shucks which are in the vicinity. A more preferred arrangement comprises a rotating blade 28 aligned with the leading edge 20 of the left guide vane 16 and a second rotating blade 29 aligned with the leading edge 21 of the right guide vane 17. The rotating blades 28 and 29 are positioned so as to pass just to the left and right, respectively, of the stationary blade 24. This blade arrangement further prevents shucks and stalks from clogging in the center of the device.

An operator platform 15 may be provided above and behind row divider 6. In this position, the operator can safely view the performance of the device and, using controls 45 located on the platform 30, control the rate of feed of the moving wall 4 as well as the rate of rotation of drum 5. Once ideal settings are found, very little further adjustment is necessary. Ladder 46 and seat 47 are provided for the comfort and safety of the operator.

As can be seen, a two row cane planter is provided which allows for even distribution of can stalks to two rows simultaneously without clogging. Many other alternate embodiments of this invention will occur to those skilled in the art, and are intended to be included within the scope and spirit of the following claims.

I claim:

1. A two row cane planter, comprising:
   a. a cart having a floor and two side walls and a front wall;
   b. feed means, for feeding stalks of can to the rear of said cart, mounted on said cart;
   c. a drum, rotatably mounted at the rear of said cart, said drum further comprising multiple teeth, protruding radially from said drum and being arranged in a left spiraling row and a right spiraling row, each said row spiraling outward from the center of said drum such that, as said drum rotates, each successive tooth in said row passes said cart floor at a point to the outside of the next preceding tooth, and
   d. a divider means, mounted at the rear of said cart, for receiving stalks of cane from said drum and dividing said stalks into two rows for planting, said divider means including an inverted V-shaped divider paltform connected to the rear of said cart and having an apex edge, positioned just below the center of said drum.

2. A two row cane planter according to claim 1, wherein said feed means comprises a movable wall mount inside said cart.

3. A two row cane planter according to claim 1, wherein said divider means comprises a row divider.

4. A two row cane planter according to claim 1, further comprising an operator platform, mounted at the rear of said cart.

5. A two row cane planter according to claim 1, wherein said drum further comprises at least one guide vane, protruding radially from said drum and spiraling outward from the center of said drum.

6. A two row cane planter according to claim 1, further comprising a stationary blade, fixedly attached to said cane planter beneath the center of said drum, and wherein said drum further comprises at least one rotating blade, protruding radially from said drum at a point where said rotating blade will pass just to one side of said stationary blade as said drum rotates.

7. A two row cane planter according to claim 1, further comprising a trash guard, said trash guard including a rigid bar or rod fixedly attached ot said apex edge of said divider means and running diagonally upward just behind said drum.

8. A two row cane planter according to claim 2, wherein said divider means comprises a row divider.

9. A two row cane planter according to claim 8, wherein said drum further comprises at least one guide vane, protruding radially from said drum and spiraling outward from the center of said drum.

10. A two row cane planter according to claim 9, further comprising a stationary blade, fixedly attached beneath the center of said drum, and wherein said drum further comprises at least one rotating blade, protruding radially from said drum at a point where said rotating blade will pass just to one side of said stationary blade as said drum rotates.

11. A two row cane planter according to claim 10, further comprising a trash guard, said trash guard including a rigid bar or rod fixedly attached to said apex edge of said divider means just behind said stationary blade and running diagonally upward just behind said drum.

12. A two row cane planter according to claim 11, further comprising an operator platform, mounted at the rear of said cart.

13. A two row cane planter according to claim 12, further comprising a variable speed drum motor, operably attached to said drum and remotely operable from said operator platform.

14. A two row cane planter according to claim 13, further comprising a winch connected to said cart and having a cable, attached to said movable wall, for moving said wall toward the rear of said cart.

* * * * *